(12) United States Patent
Park et al.

(10) Patent No.: US 8,847,893 B2
(45) Date of Patent: Sep. 30, 2014

(54) TOUCH SCREEN PANEL AND METHOD OF FABRICATING THE SAME

(75) Inventors: Jung-Mok Park, Yongin (KR); Sun-Haeng Cho, Yongin (KR); Chang-Yong Lee, Yongin (KR); Jin-Yeol Kim, Yongin (KR); Seong-Je Huang, Yongin (KR); In-Won Jang, Yongin (KR); Dong-Wook Kang, Yongin (KR); Tae-Hyeong Kim, Yongin (KR)

(73) Assignee: Samsung Display Co., Ltd., Yongin-si (KR)

(*) Notice: Subject to any disclaimer, the term of this patent is extended or adjusted under 35 U.S.C. 154(b) by 676 days.

(21) Appl. No.: 12/543,421

(22) Filed: Aug. 18, 2009

(65) Prior Publication Data

US 2010/0182253 A1 Jul. 22, 2010

(30) Foreign Application Priority Data

Jan. 16, 2009 (KR) .................. 10-2009-0003635

(51) Int. Cl.
*G06F 3/041* (2006.01)
*G09G 5/00* (2006.01)
*G06F 3/044* (2006.01)

(52) U.S. Cl.
CPC ...... *G06F 3/044* (2013.01); *G06F 2203/04103* (2013.01)
USPC .......................................... 345/173; 345/156

(58) Field of Classification Search
USPC ............. 345/156–184, 104; 178/18.01–20.04
See application file for complete search history.

(56) References Cited

U.S. PATENT DOCUMENTS

| 4,760,003 | A | * | 7/1988 | Matsumoto et al. ........ 430/58.25 |
| 5,392,058 | A | * | 2/1995 | Tagawa ......................... 345/104 |
| 6,188,391 | B1 | * | 2/2001 | Seely et al. .................... 345/173 |
| 6,204,896 | B1 | | 3/2001 | Matsuhira et al. |

(Continued)

FOREIGN PATENT DOCUMENTS

| JP | 60140215 A | * | 7/1985 |
| JP | 63-174120 A | | 7/1988 |

(Continued)

OTHER PUBLICATIONS

Screen Media Mag.com, Aug. 1, 2007, http://www.screenmediamag.com/screenmedianews/2721-New-technologies-shapethe-displays-of-the-future, pp. 1-2.*

(Continued)

*Primary Examiner* — Patrick F Marinelli
(74) *Attorney, Agent, or Firm* — Christie, Parker & Hale, LLP

(57) ABSTRACT

A touch screen panel for an image display device and a method of fabricating the same. The touch screen panel includes first and second substrates facing each other, the first and second substrates being joined together by a sealant; a plurality of first sensing patterns coupled to one another along a first direction on a side of the first substrate facing the second substrate; a plurality of second sensing patterns coupled to one another along a second direction on a side of the second substrate facing the first substrate; a plurality of first dummy patterns between the first sensing patterns corresponding to the second sensing patterns; a plurality of second dummy patterns between the second sensing patterns corresponding to the first sensing patterns; and an insulating layer between the first and second substrates.

7 Claims, 8 Drawing Sheets

(56) References Cited

U.S. PATENT DOCUMENTS

| | | | |
|---|---|---|---|
| 6,310,614 B1* | 10/2001 | Maeda et al. | 345/173 |
| 8,092,662 B2* | 1/2012 | Mao et al. | 204/403.12 |
| 2001/0022342 A1* | 9/2001 | Wirthlin | 250/229 |
| 2003/0052867 A1* | 3/2003 | Shigetaka et al. | 345/173 |
| 2003/0234769 A1 | 12/2003 | Cross et al. | |
| 2005/0156906 A1 | 7/2005 | Chiu et al. | |
| 2006/0044279 A1* | 3/2006 | Nasu et al. | 345/169 |
| 2007/0062739 A1* | 3/2007 | Philipp et al. | 178/18.06 |
| 2007/0291009 A1* | 12/2007 | Wright et al. | 345/173 |
| 2008/0088595 A1* | 4/2008 | Liu et al. | 345/173 |
| 2008/0138589 A1 | 6/2008 | Wakabayashi et al. | |
| 2008/0150905 A1* | 6/2008 | Grivna et al. | 345/173 |
| 2008/0309633 A1 | 12/2008 | Hotelling et al. | |
| 2009/0085885 A1* | 4/2009 | Wu et al. | 345/173 |
| 2009/0102808 A1* | 4/2009 | Huang et al. | 345/173 |
| 2010/0045625 A1* | 2/2010 | Yang et al. | 345/173 |
| 2010/0073316 A1 | 3/2010 | Nozawa et al. | |

FOREIGN PATENT DOCUMENTS

| | | |
|---|---|---|
| JP | 64-041022 A | 2/1989 |
| JP | 8-272532 | 10/1996 |
| JP | 9-274536 | 10/1997 |
| JP | 2004-133766 | 4/2004 |
| JP | 2005-530996 A | 10/2005 |
| JP | 2006-338668 | 12/2006 |
| JP | 2008-129708 | 6/2008 |
| KR | 10-2001-0034828 A | 4/2001 |
| KR | 10-2004-0030345 | 4/2004 |
| KR | 10-2005-0072680 A | 7/2005 |
| KR | 10-2006-0114596 | 11/2006 |
| KR | 10-2007-0017296 | 2/2007 |
| WO | WO 2006/126604 A1 | 11/2006 |
| WO | WO 2008/117838 A1 | 10/2008 |
| WO | WO 2010/054204 A2 | 5/2010 |

OTHER PUBLICATIONS

KIPO Office action dated Oct. 27, 2010 in priority Korean application No. 10-2009-0003635.
KIPO Office action dated Jun. 25, 2011, for Korean priority Patent application 10-2009-0003635, 1 page.
Chinese Office action dated Aug. 17, 2011 issued to Patent Application No. 2009-10209382.8, which claims priority to corresponding Korean Application No. 10-2009-0003635, 7 pages.
Japanese Office action dated Nov. 1, 2011 issued to Patent Application No. 2009-165811, which claims priority to corresponding Korean Patent Application No. 10-2009-0003635, 3 pages.
SIPO Office action dated Mar. 26, 2012, for corresponding Chinese Patent application 200910209382.8, 8 pages.
Japanese Office Action dated Sep. 4, 2012 of the corresponding Japanese Patent Application No. 2009-165811.
EPO Search Report dated Apr. 8, 2013, for corresponding European Patent application 09176884.6, (8 pages).
Japanese Office Action, Dated Nov. 26, 2013, Issued in the Corresponding Japanese Patent Application No. 2009-165811, 18 Pages.

* cited by examiner

TOUCH SCREEN PANEL AND METHOD OF FABRICATING THE SAME

CROSS-REFERENCE TO RELATED APPLICATIONS

This application claims priority to and the benefit of Korean Patent Application No. 10-2009-0003635, filed on Jan. 16, 2009, in the Korean Intellectual Property Office, the entire content of which is incorporated herein by reference.

BACKGROUND OF THE INVENTION

1. Field of the Invention

The present invention relates to a touch screen panel for an image display device or the like and a method of fabricating the same.

2. Description of Related Art

A touch screen panel is an input device that allows a user's instruction to be inputted to an image display device or the like by selecting an instruction content displayed on a screen of the image display device with a user's finger or an object.

To this end, a touch screen panel is provided on a front side of an image display device to convert a touch at a contact position into an electrical signal. At the contact position, a user's finger or an object is directly in contact with the touch screen panel. Accordingly, an instruction content selected at the contact position is inputted as an input signal to the image display device.

The applications for a touch screen panel have gradually expanded because it can be used to operate an image display device and replace a separate input device (e.g., a keyboard or mouse) connected to the image display device.

Touch screen panels are classified into a resistive overlay type touch screen panel, an infrared beam type touch screen panel, a capacitive overlay type touch screen panel, and the like.

Among these touch screen panels, the capacitive overlay type touch screen panel converts a touch at a contact position into an electrical signal by sensing a change in capacitance formed between a conductive sensing pattern and another sensing pattern adjacent to the conductive sensing pattern, a ground electrode or the like when a user's finger or an object is in contact with the touch screen panel.

To determine a precise contact position on a contact surface, sensing patterns include first sensing patterns (e.g., X-patterns) formed along a first direction to be connected to one another, and second patterns (e.g., Y-patterns) formed along a second direction to be connected to one another.

The first and second sensing patterns are generally formed on the same layer of material. In this case, sensing patterns arranged in the same X or Y line (or direction) are connected by forming separate connection patterns through contact holes formed in an insulating layer formed on the sensing patterns. Therefore, the number of masks utilized during fabrication may be increased, and a fabrication process may be complicated. Further, it is difficult to sufficiently maintain insulating characteristics of the insulating layer at crossing portions of the first and second sensing patterns (i.e., portions at which the connection patterns are formed).

SUMMARY OF THE INVENTION

Accordingly, it is an aspect of embodiments of the present invention to provide a touch screen panel capable of decreasing the number of masks utilized during fabrication, simplifying a fabrication process and sufficiently maintaining insulating characteristics between sensing patterns, and a method of fabricating the touch screen panel.

According to an embodiment of the present invention, there is provided a touch screen panel including first and second substrates facing each other, the first and second substrates being joined together by a sealant; a plurality of first sensing patterns coupled to one another along a first direction on a side of the first substrate facing the second substrate; a plurality of second sensing patterns coupled to one another along a second direction on a side of the second substrate facing the first substrate; a plurality of first dummy patterns between the first sensing patterns and corresponding to the second sensing patterns; a plurality of second dummy patterns between the second sensing patterns and corresponding to the first sensing patterns; and an insulating layer between the first and second substrates. The second sensing patterns may be alternately arranged with the first sensing patterns so as not to overlap with the first sensing patterns.

The first and second sensing patterns may each include sensing patterns coupled in columns or rows along the first or second direction, and pad portions coupled to the columns or rows.

The touch screen panel may further include a plurality of metal patterns electrically coupled to the pad portions of the first and second sensing patterns, the metal patterns electrically coupling the first and second sensing patterns to respective position detecting lines.

The sealant may be between at least the metal patterns and the pad portions of the first or second sensing patterns, and may include a conductive material through which the pad portions of the first or second sensing patterns are electrically coupled to the metal patterns.

The insulating layer may include at least one of a first insulating layer for covering the first sensing patterns and the first dummy patterns, or a second insulating layer for covering the second sensing patterns and the second dummy patterns.

The insulating layer may include a filler material for filling a space between the first substrate having the first sensing patterns and the first dummy patterns formed thereon and the second substrate having the second sensing patterns and the second dummy patterns formed thereon. The filler material may be a super view resin (SVR).

The first or second substrate may include an integrally formed window.

The first and second dummy patterns may be formed of same transparent materials as those of the first and second sensing patterns, respectively. The respective first and second dummy patterns may include separated patterns.

According to another embodiment of the present invention, there is provided a method of fabricating a touch screen panel. The method includes forming a plurality of first sensing patterns and a plurality of first dummy patterns on a first substrate, the first sensing patterns being coupled to one another along a first direction and the first dummy patterns being formed between the first sensing patterns; forming a plurality of second sensing patterns and a plurality of second dummy patterns on a second substrate, the second sensing patterns being coupled to one another along a second direction and the second dummy patterns being formed between the second sensing patterns; aligning the first and second substrates together, thereby the second sensing patterns being alternately arranged with the first sensing patterns so as not to overlap with the first sensing patterns; and joining the first and second substrates together using a sealant.

The method may further include filling a space between the first and second substrates with a filler material. The filler material may be injected between the first and second substrates using an injection technique. Alternatively, the filler material may be filled between the first and second substrates using a vacuum dropping technique.

According to the embodiments of the present invention, first sensing patterns coupled to one another along a first direction and second sensing patterns coupled to one another along a second direction are formed on different substrates, respectively, and an insulating layer is interposed between the first and second substrates, thereby decreasing the number of masks utilized during fabrication, simplifying a fabrication process and maintaining sufficient insulating characteristics between the first and second sensing patterns.

Further, first and second dummy patterns corresponding to the second and first sensing patterns are formed between the first sensing patterns and between the second sensing patterns, respectively, so that the first and second sensing patterns are disposed on different substrates on different layers, respectively, thereby reducing the difference of reflectances between the first and second sensing patterns.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF EXEMPLARY EMBODIMENTS

Figure 1:
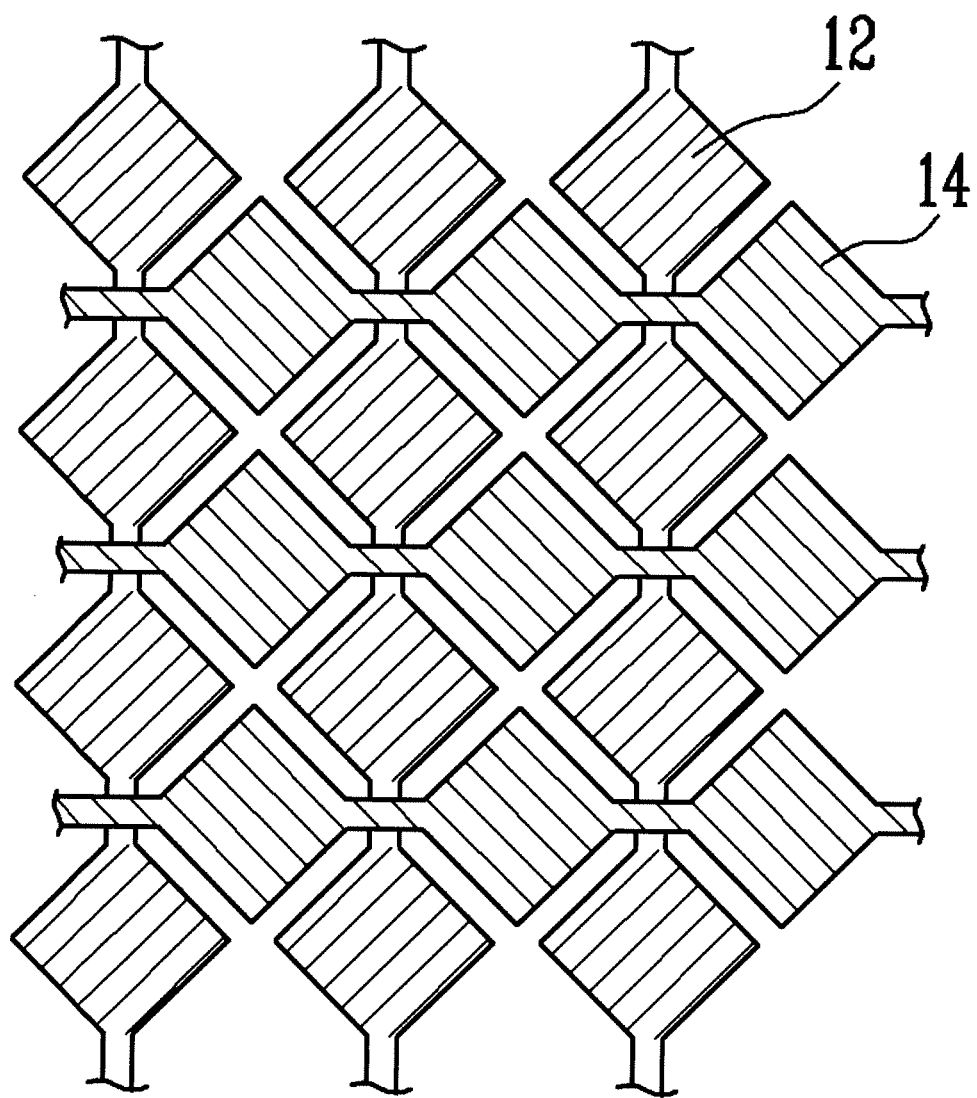
FIG. 1 is a schematic plan view showing the arrangement of sensing patterns according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" or "coupled to" another element, it can be directly connected to or coupled to the another element or be indirectly connected to or coupled to the another element with one or more intervening elements interposed therebetween. Hereinafter, like reference numerals refer to like elements.

FIG. 1 is a schematic plan view showing the arrangement of sensing patterns according to an embodiment of the present invention.

Referring to FIG. 1, the sensing patterns according to the embodiment of FIG. 1 include first sensing patterns 12 connected to one another in columns and second sensing patterns 14 connected to one another in rows. The first sensing patterns 12 in each column have the same X-coordinate, and the second sensing patterns 14 in each row have the same Y-coordinate. The first and second sensing patterns 12 and 14 are alternately arranged to cross each other.

For example, the first sensing patterns 12 may be configured as a plurality of X-patterns formed so that first sensing patterns 12 positioned on one column with the same X-coordinate are connected to one another along a first direction (e.g., a column direction). The second sensing patterns 14 may be configured as a plurality of Y-patterns formed so that second sensing patterns 14 positioned on one row with the same Y-coordinate are connected to one another along a second direction (e.g., a row direction).

However, in the above described embodiment of the present invention, the first and second sensing patterns 12 and 14 are formed on different substrates, respectively. For example, the first sensing patterns 12 may be formed on a lower substrate, and the second sensing patterns 14 may be formed on an upper substrate.

That is, the first and second sensing patterns 12 and 14 are formed on different layers of materials, respectively. An insulating layer is interposed between the first and second sensing patterns 12 and 14.

Accordingly, in the above described embodiment of the present invention, there can be provided a touch screen panel capable of decreasing the number of masks utilized during fabrication, simplifying its fabrication process and maintaining sufficient insulating characteristics between the first and second sensing patterns 12 and 14. More detailed description will be described later.

Figure 2:
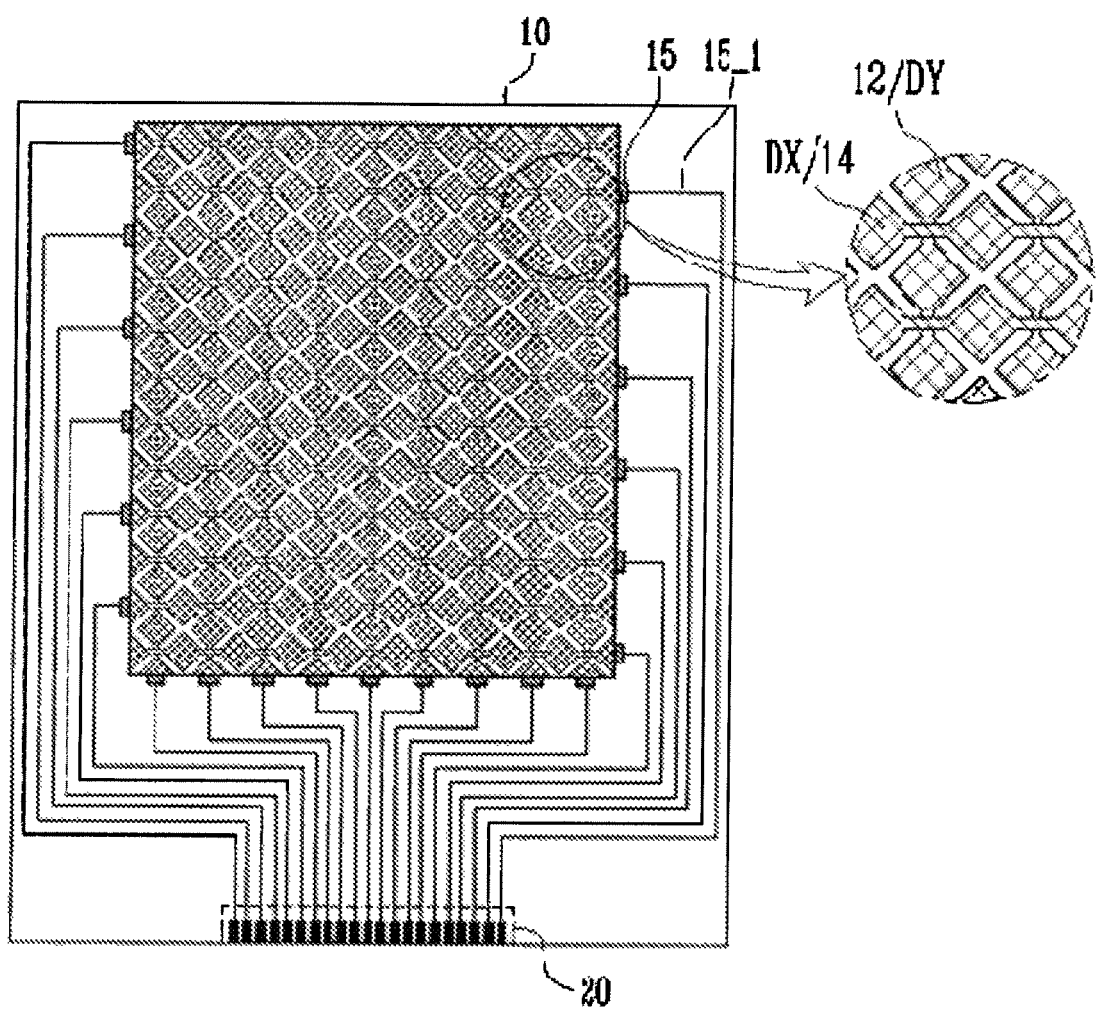
FIG. 2 is a schematic plan view showing a touch screen panel according to an embodiment of the present invention.
Figure 3A:
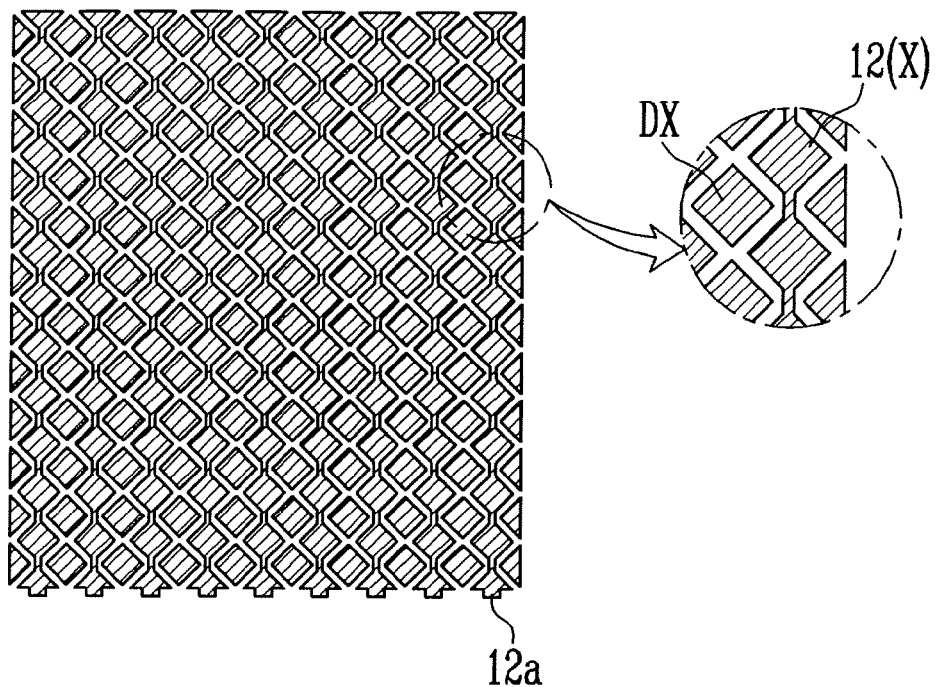
FIG. 3A is a schematic plan view showing an example of first sensing patterns and first dummy patterns, shown in FIG. 2.
Figure 3B:
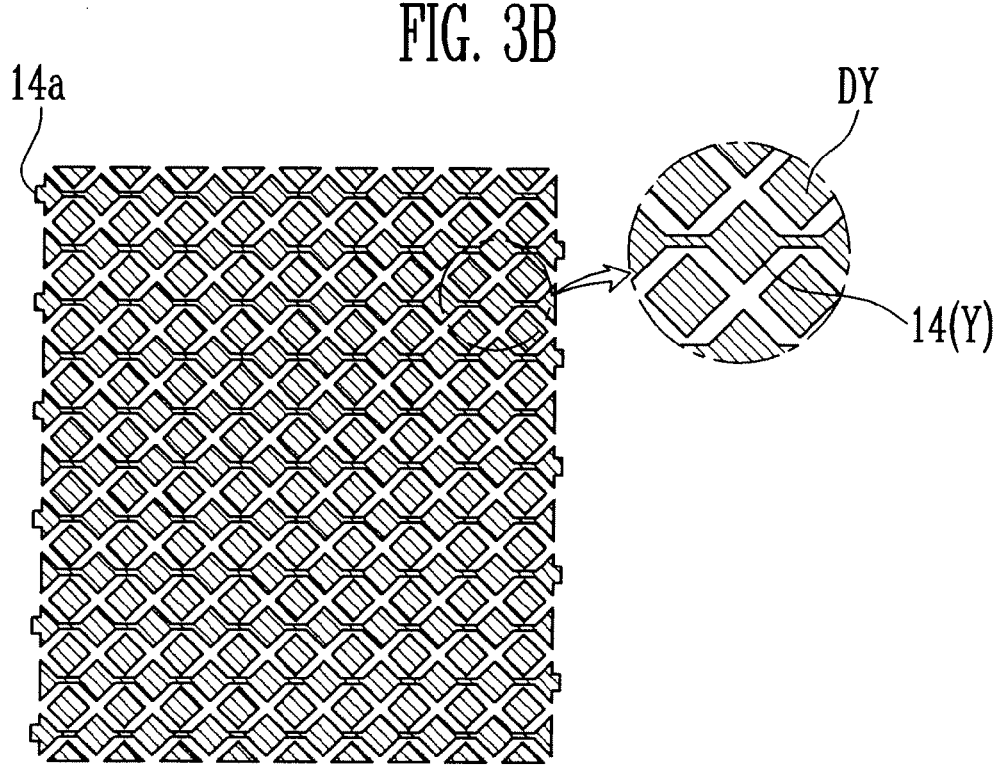
FIG. 3B is a schematic plan view showing an example of second sensing patterns and second dummy patterns, shown in FIG. 2.

FIG. 2 is a schematic plan view showing a touch screen panel according to an embodiment of the present invention. FIG. 3A is a schematic plan view showing an example of first sensing patterns and first dummy patterns, shown in FIG. 2. FIG. 3B is a schematic plan view showing an example of second sensing patterns and second dummy patterns, shown in FIG. 2.

Referring to FIGS. 2 to 3B, a touch screen panel 10 according to the embodiment of the present invention includes a plurality of first and second sensing patterns 12 and 14 which are alternately arranged to cross each other and formed close to one another in a regular pattern such as a diamond pattern, and a plurality of metal patterns 15 through which the first and second sensing patterns 12 and 14 are electrically connected to position detecting lines 15_1. A plurality of first dummy patterns DX and a plurality of second dummy patterns DY are formed in regions (e.g., dummy regions) between the first sensing patterns 12 and regions (e.g., dummy regions) between the second sensing patterns 14, respectively.

The first sensing patterns 12 are formed of a suitable transparent electrode material and include a plurality of patterns patterned to be connected to one another along a first direction. Here, the first direction may be a column or row direction on a matrix. For the convenience of illustration, it will be assumed hereinbelow that the first direction is a column direction. For example, the first sensing patterns 12 may be configured as a plurality of X-patterns patterned so that first sensing patterns 12 positioned on one column with the same X-coordinate are connected to one another.

The first sensing patterns 12 connected in columns include pad portions 12a that connect the columns to the position detecting lines 15_1 through the metal patterns 15 connected to the pad portions 12a.

The plurality of first dummy patterns DX are formed in the dummy regions between the first sensing patterns 12 so as to correspond to the second sensing patterns 14 (e.g., to overlap with the second sensing patterns 14). The first dummy patterns DX are formed as separated patterns and are not connected to the position detecting lines 15_1.

The first dummy patterns DX may be formed of the same transparent electrode material as that of the first sensing patterns 12. That is, the first dummy patterns DX may be patterned together with the first sensing patterns 12 in the process of forming the first sensing patterns 12.

The second sensing patterns 14 are formed of a transparent electrode material and include a plurality of patterns to be connected to one another along a second direction. Here, the second direction is a direction crossing with the first direction. For example, if the first direction is set as a column direction, the second direction may be set as a row direction.

In this case, the second sensing patterns 14 may be configured as a plurality of Y-patterns patterned so that second sensing patterns 14 positioned on one row with the same Y-coordinate are connected to one another.

The second sensing patterns 14 connected in rows have pad portions 14a that connect the rows to the position detecting lines 15_1 through the metal patterns 15 connected to the pad portions 14a.

The plurality of second dummy patterns DY are formed in the dummy regions between the second sensing patterns 14 so as to correspond to the first sensing patterns 12 (e.g., to overlap with the first sensing patterns 12). The second dummy patterns DY are formed as separated patterns, and are not connected to the position detecting lines 15_1.

The second dummy patterns DY may be formed of the same transparent electrode material as that of the second sensing patterns 14. That is, the second dummy patterns DY may be patterned together with the second sensing patterns 14 in the process of forming the second sensing patterns 14.

The metal patterns 15 are electrically connected to the pad portions 12a and 14a at edge portions of a region in which the first and second sensing patterns 12 and 14 are positioned, and electrically connect the first and second sensing patterns 12 and 14 to the position detecting lines 15_1.

For example, the metal patterns 15 may connect the column-connected first sensing patterns 12 and the row-connected second sensing patterns 14 to the corresponding position detecting lines 15_1.

The position detecting lines 15_1 are connected to the respective first and second sensing patterns 12 and 14 through the metal patterns 15 so that the first and second sensing patterns 12 and 14 are connected to a suitable driving circuit. For example, when the touch screen panel is connected to an external driving circuit through the pad unit 20, the position detecting lines 15_1 are connected between the pad unit 20 and the sensing patterns 12 and 14.

In addition, it has been described in the above embodiment that the metal patterns 15 and the position detecting lines 15_1 are separated individual components. However, the metal patterns 15 and the position detecting lines 15_1 may be integrally formed together using the same material in the same process.

The touch screen panel described above is a capacitive overlay type touch screen panel. If a user's finger or a contact object such as a touch stick (or stylus) is in contact with the touch screen panel, a change in capacitance at the contact position is provided to the driving circuit via the metal patterns 15, position detecting lines 15_1 and the pad unit 20 from the sensing patterns 12 and 14. The change in capacitance is converted in an electric signal by suitable X and Y input processing circuits and the like, thereby detecting the contact position.

However, in the above described embodiment of the present invention, the first and second sensing patterns 12 and 14 are formed on different substrates as different layers of materials, respectively. In this embodiment, the first and second sensing patterns 12 and 14 can be patterned to be connected to one another along the first and second directions, respectively. Accordingly, processes of forming separate contact holes and connecting patterns can be omitted, thereby decreasing the number of masks utilized during fabrication and simplifying a fabrication process.

Further, as the first and second sensing patterns 12 and 14 are formed on different substrates, respectively, a sufficient spacing distance between the first and second sensing patterns 12 and 14 is maintained, thereby improving insulating characteristics between the first and second sensing patterns 12 and 14. In an embodiment of the present invention, an insulating layer is interposed between the substrates in which the first and second sensing patterns 12 and 14 are respectively formed, thereby further improving insulating characteristics between the first and second sensing patterns 12 and 14.

Furthermore, in the embodiment of the present invention, the first and second dummy patterns DX and DY are formed between the first sensing patterns 12 and between the second sensing patterns 14, respectively, so that the first and second sensing patterns 12 and 14 are provided on different substrates as different layers of materials, respectively, thereby reducing the difference of reflectances between the first and second sensing patterns 12 and 14.

Figure 4:
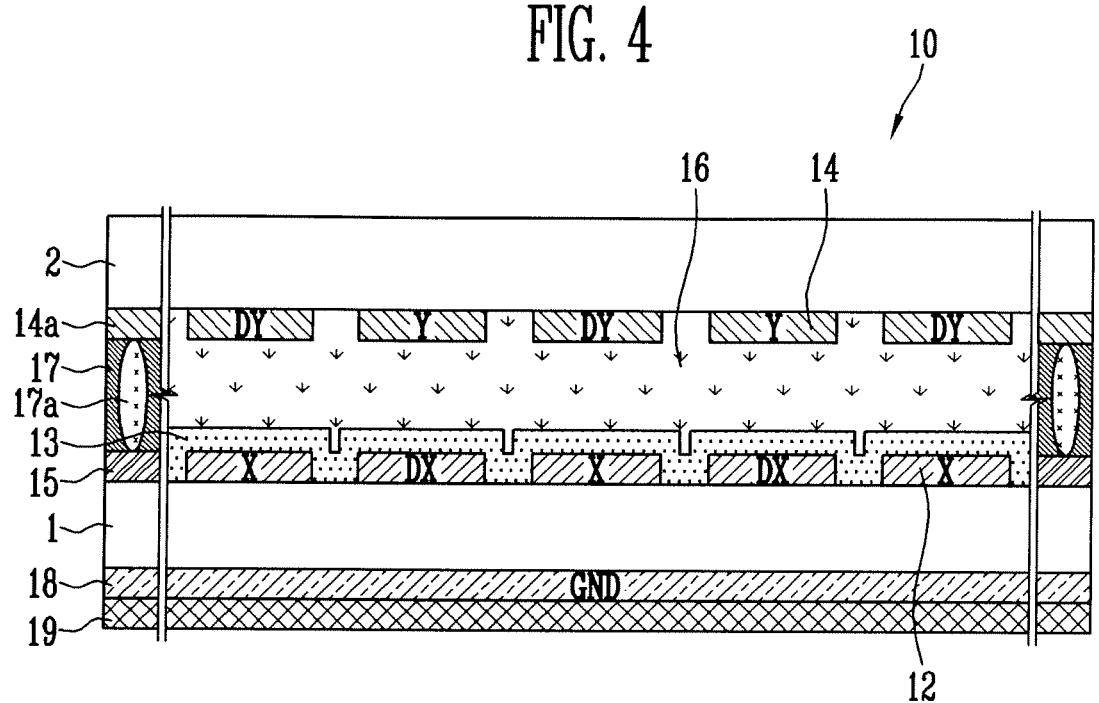
FIG. 4 is a schematic cross-sectional view of a main section of the assembled touch screen panel shown in FIG. 2.

FIG. 4 is a schematic cross-sectional view of a main section of the assembled touch screen panel shown in FIG. 2. In FIG. 4, elements like those of FIGS. 2 to 3B are designated with the like reference numerals, and their detailed descriptions will be omitted. For the convenience of illustration, connection portions of the first and second sensing patterns are not shown in FIG. 4.

Referring to FIG. 4, the touch screen panel 10 includes first and second substrates 1 and 2 which are opposite to each other and joined together by a sealant 17. Here, the first and second substrates 1 and 2 are upper and lower substrates of the touch screen panel 10, respectively. The upper substrate may be integrally formed with a window.

For the convenience of illustration, it will be assumed hereinbelow that the first and second substrates 1 and 2 are referred to as lower and upper substrates, respectively. However, the first and second substrates 1 and 2 may be upper and lower substrates, respectively.

The plurality of first sensing patterns 12, the plurality of first dummy patterns DX and the plurality of metal patterns 15 are formed on an upper surface of the first substrate 1, i.e., a surface facing the second substrate 2. Here, the first sensing patterns 12 are connected to one another along the first direction, and the first dummy patterns DX formed between the first sensing patterns 12 correspond to the second sensing patterns 14. Although not shown in FIG. 4, the position detecting lines 15_1 and the pad unit 20 of the touch screen panel 10, which are shown in FIG. 2, may be further formed on the surface of the first substrate 1.

In addition, a transparent ground electrode 18 and an insulating layer 19 that covers the transparent ground electrode 18 may be further formed on a lower surface of the first substrate 1, i.e., the other surface facing a display panel.

The transparent ground electrode 18 may maintain stability between the touch screen panel 10 and the display panel. The transparent ground electrode 18 may also form capacitances with the first and second sensing patterns 12 and 14, depending on a design method of the touch screen panel 10. In some embodiments of the present invention, the transparent ground electrode 18 and/or the insulating layer 19 may be omitted depending on a design method of the touch screen panel 10.

The plurality of second sensing patterns 14 and the plurality of second dummy patterns DY are formed on a lower surface of the second substrate 2, i.e., a surface facing the first substrate 1. Here, the second sensing patterns 14 are connected to one another along the second direction and positioned not to overlap with the first sensing patterns 12, and the second dummy patterns DY are formed between the second sensing patterns 14 to correspond to the first sensing patterns 12.

Here, the pad portions 14a of the second sensing patterns 14 are electrically connected to the metal patterns 15 through the sealant 17. To this end, the sealant includes a conductive material such as a conductive ball 17a, and may be interposed at least between the pad portions 14a of the second sensing patterns 14 and the metal patterns 15.

In another embodiment of the present invention, when the first sensing patterns 12 and the metal patterns 15 are formed on different substrates, respectively, the sealant 17 may electrically connect the pad portions 12a of the first sensing patterns 12 to the metal patterns 15.

An insulating layer is interposed in the space between the first and second substrates 1 and 2 joined together by the sealant 17.

For example, the insulating layer may include a first insulating layer 13 formed on the first substrate 1 so as to cover the first sensing patterns 12 and the first dummy patterns DX. The insulating layer may also include a second insulating layer formed on the second substrate 2 so as to cover the second sensing patterns 14 and the second dummy patterns DY. However, the first insulating layer 13 and the second insulating layer may be selectively provided. That is, any one or both of the first and second insulating layers may be provided. Alternatively, both of the first and second insulating layers may not be provided.

The insulating layer may include a filler material 16 for filling the space between the upper surface of the first substrate 1 and the lower surface of the second substrate 2.

Here, the filler material 16 may be formed of a suitable material having a refractive index between the refractive index of the first or second substrate 1 or 2 and the refractive index of air. For example, when the first and second substrates 1 and 2 are formed of glass, the filler material 16 may be formed of a super view resin (SVR) having a refractive index similar to that of glass.

The filler material 16 may be filled between the first and second substrates 1 and 2 by using a suitable injection or dropping technique.

As described above, in the touch screen panel 10 according to the embodiment of the present invention, the first and second sensing patterns 12 and 14 are formed on different substrates, respectively, and the insulating layer including the filler material 16 is also formed between the first and second substrates 1 and 2.

Accordingly, it is unnecessary to form a separate connection pattern that connects the first or second sensing patterns 12 or 14 to one another, thereby decreasing the number of masks utilized during fabrication and simplifying a fabrication process.

Further, the insulating layer is interposed between the first and second sensing patterns 12 and 14, and the first and second sensing patterns 12 and 14 are formed on different substrates, respectively, thereby maintaining a sufficient distance between the first and second sensing patterns 12 and 14. Accordingly, it is possible to maintain sufficient insulating characteristics between the first and second sensing patterns 12 and 14.

The touch screen panel 10 according to the embodiment of the present invention includes the first dummy patterns DX formed between the first sensing patterns 12 to correspond to the second sensing patterns 14 and the second dummy patterns DY formed between the second sensing patterns 14 to correspond to the first sensing patterns 12.

Therefore, the touch screen panel 10 has a similar pattern in which the layer of material having the first sensing patterns 12 formed therein corresponds to that having the second sensing patterns 14 formed therein. Accordingly, a touch region (a light transmission region in which the first and second sensing patterns 12 and 14 are formed) in the touch screen panel 10 has a substantially uniform reflectance throughout the entire touch region.

FIGS. 5A to 5D are schematic cross-sectional views sequentially illustrating a method of fabricating the touch screen panel shown in FIG. 4 using an injection technique.

Figure 5A:
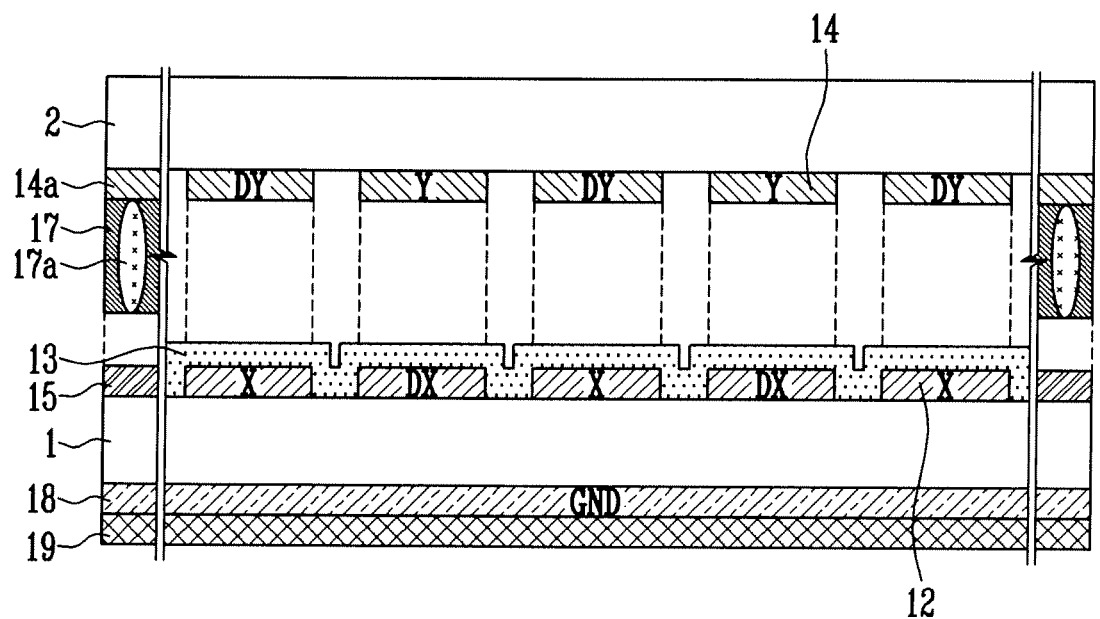
FIGS. 5A, 5B, 5C and 5D are schematic cross-sectional views sequentially illustrating a method of fabricating the touch screen panel shown in FIG. 4 using an injection technique.

The method of fabricating the touch screen panel will be described with reference to FIGS. 5A to 5D. First, as shown in FIG. 5A, first and second substrates 1 and 2 are prepared and then aligned together. Here, the first substrate 1 includes first sensing patterns 12, first dummy patterns DX and metal patterns 15, and the second substrate 2 includes second sensing patterns 14 and second dummy patterns DY.

Figure 7A:
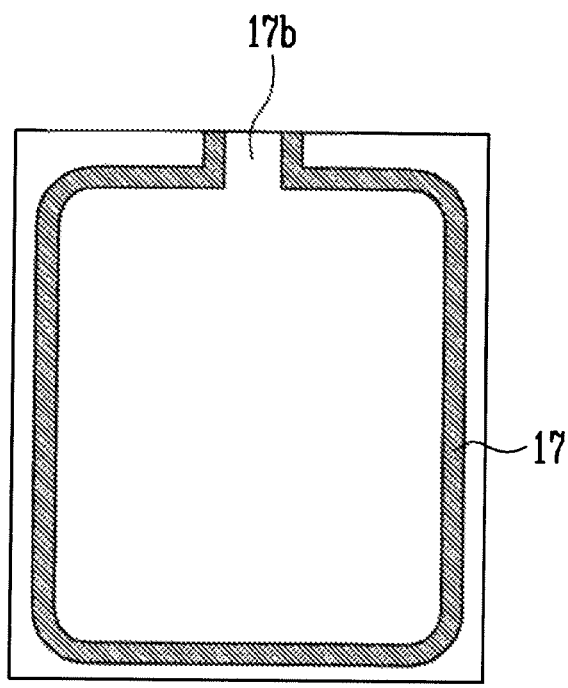
FIG. 7A is a schematic plan view showing the shape of a sealant formed using the injection technique.

Here, a sealant 17 having an injection port 17b is formed around the outer perimeter of the first or second substrate 1 or 2 as shown in FIG. 7A.

Figure 5B:
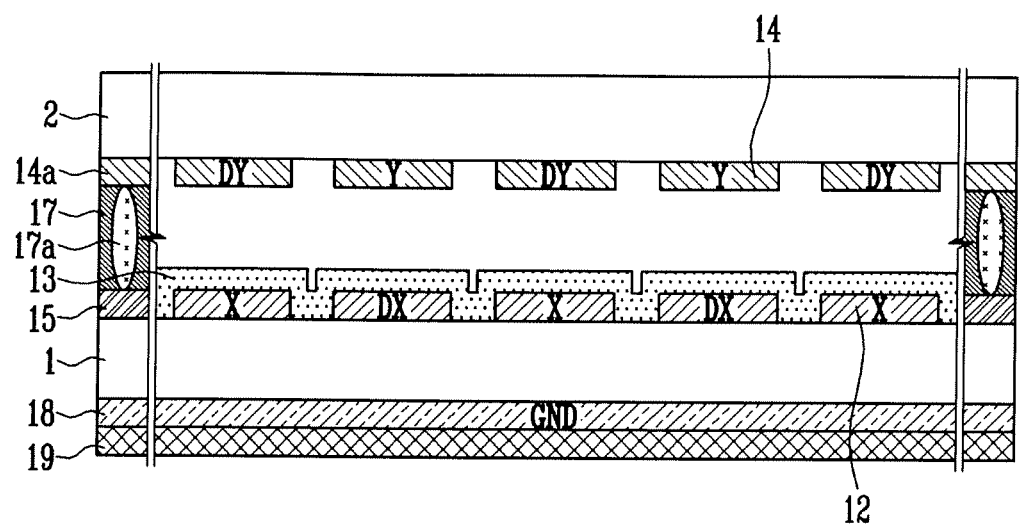

Thereafter, as shown in FIG. 5B, the first and second substrates 1 and 2 are assembled and then joined together by the sealant 17.

Figure 5C:
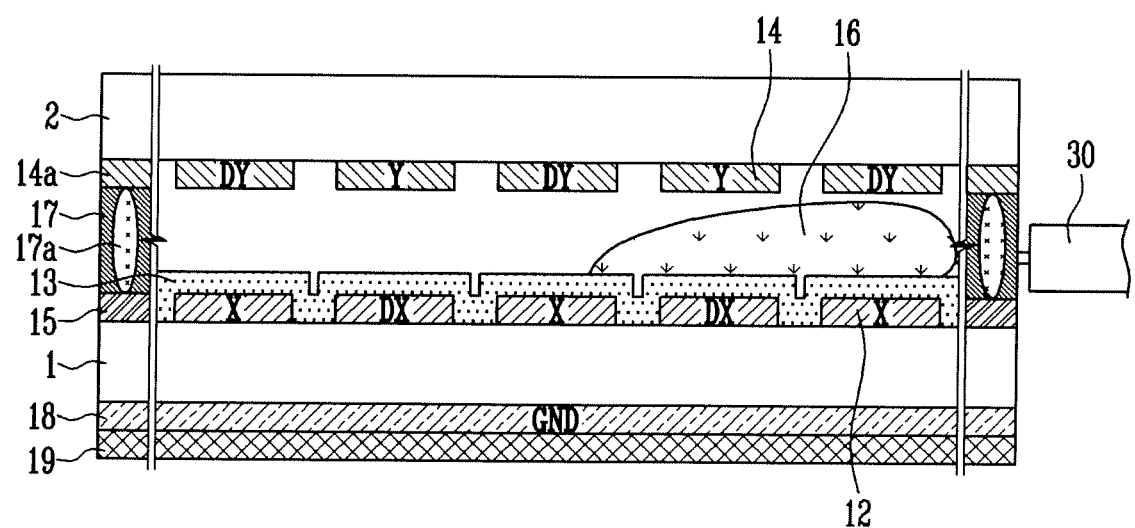

Thereafter, as shown in FIG. 5C, a filler material 16 such as SVR is injected between the first and second substrates 1 and 2 using an injector 30.

Figure 5D:
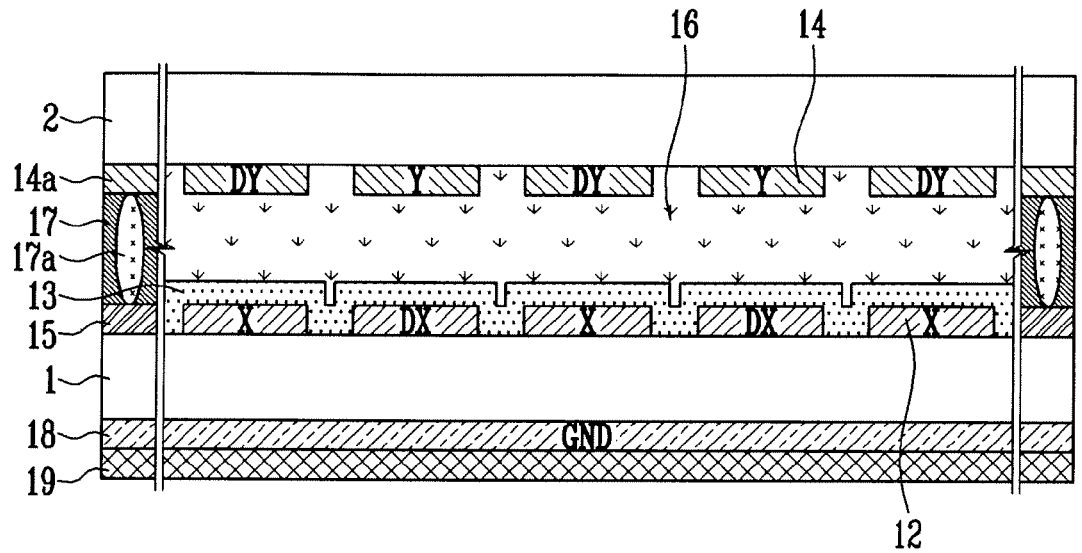

Thereafter, as shown in FIG. 5D, the filler material 16 is used to fill the space between the first and second substrates 1 and 2, and the injection port 17b is then sealed.

As described above, the touch screen panel is fabricated using the injection technique, thereby minimizing production of air bubbles and inflow of foreign matters in the process of filling the space between the first and second substrates 1 and 2 with the filler material 16.

Figure 6A:
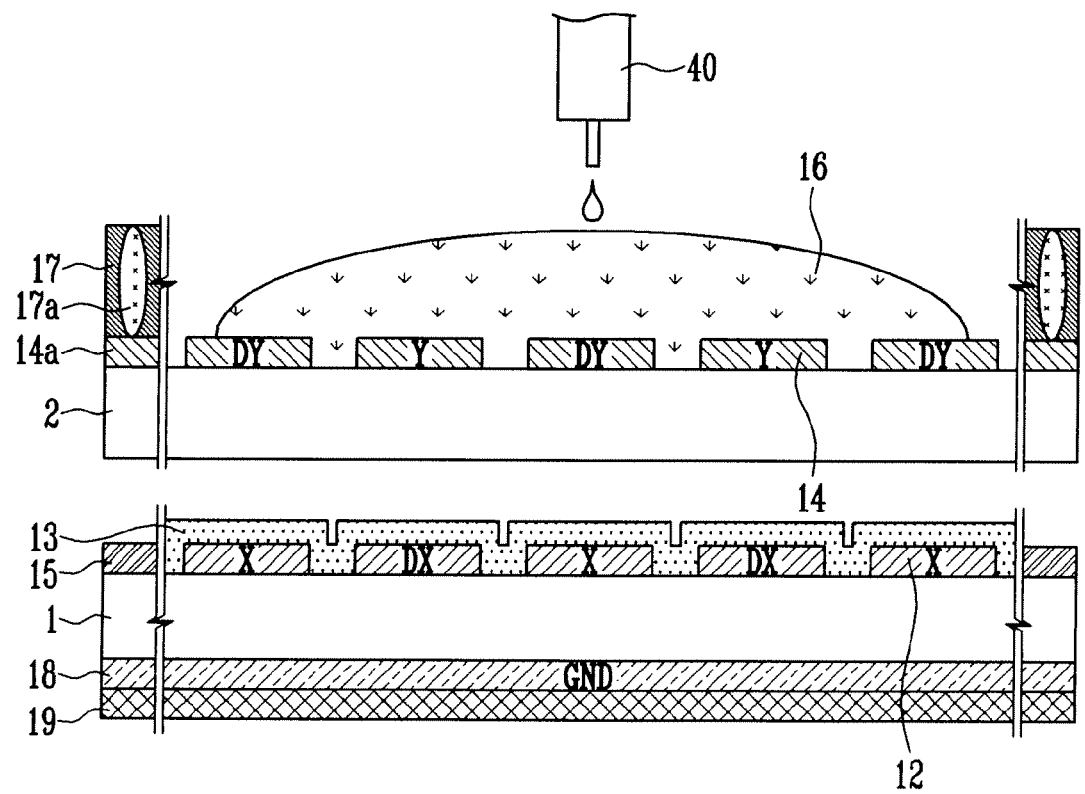
FIGS. 6A, 6B and 6C are schematic cross-sectional views sequentially illustrating a method of fabricating the touch screen panel shown in FIG. 4 using a dropping technique.
Figure 6B:
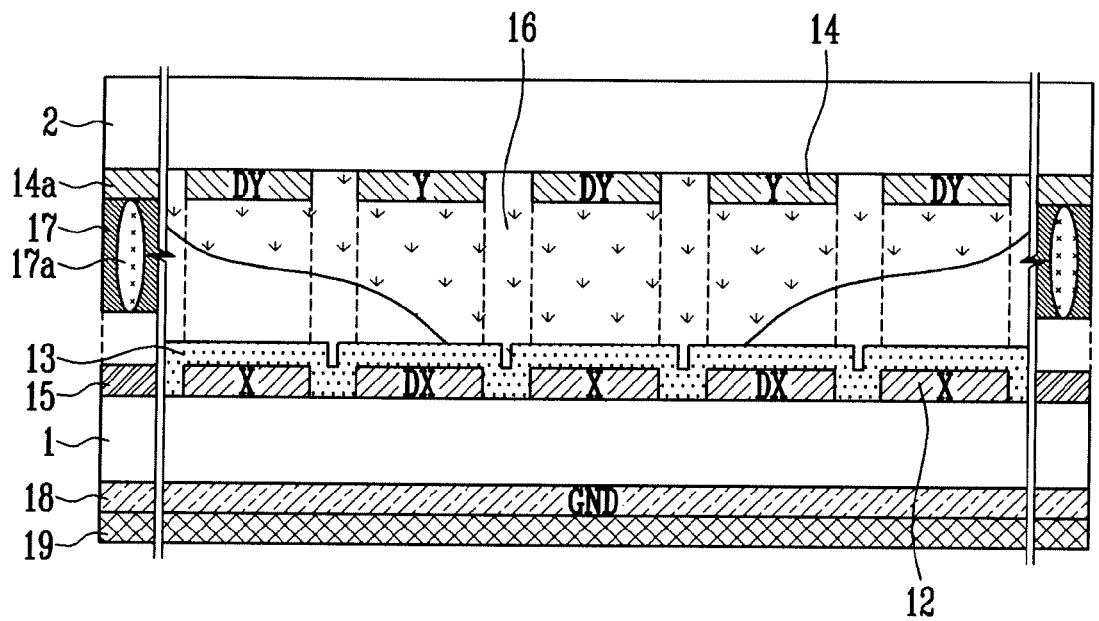
Figure 6C:
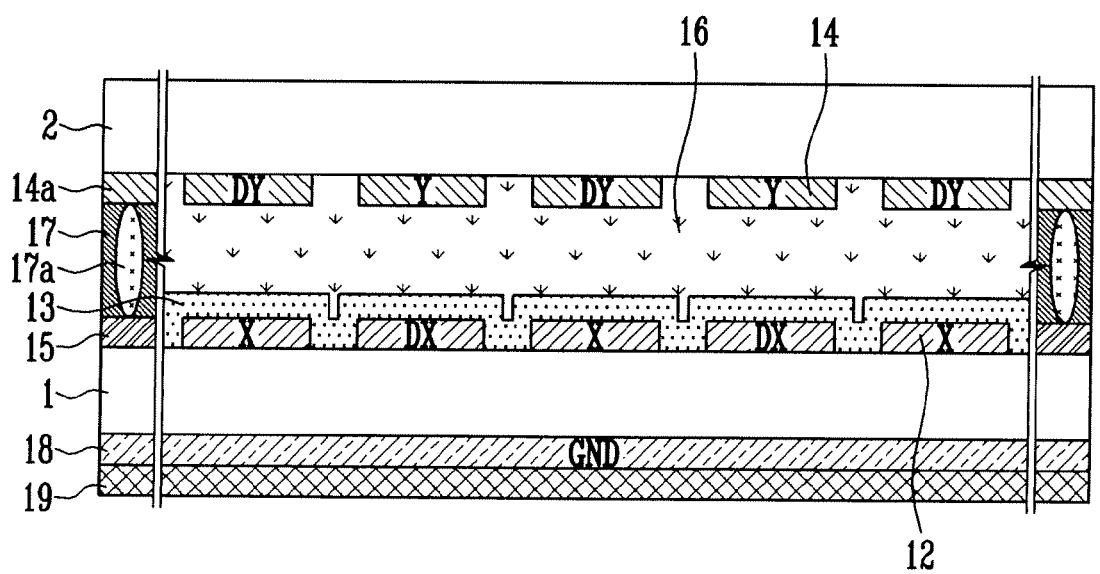

FIGS. 6A to 6C are schematic cross-sectional views sequentially illustrating a method of fabricating the touch screen panel shown in FIG. 4 using a dropping technique.

The method of fabricating the touch screen panel will be described with reference to FIGS. 6A to 6C. First, as shown in FIG. 6A, first and second substrates 1 and 2 are prepared. Here, the first substrate 1 includes first sensing patterns 12, first dummy patterns DX and metal patterns 15, and the second substrate 2 includes second sensing patterns 14 and second dummy patterns DY.

Figure 7B:
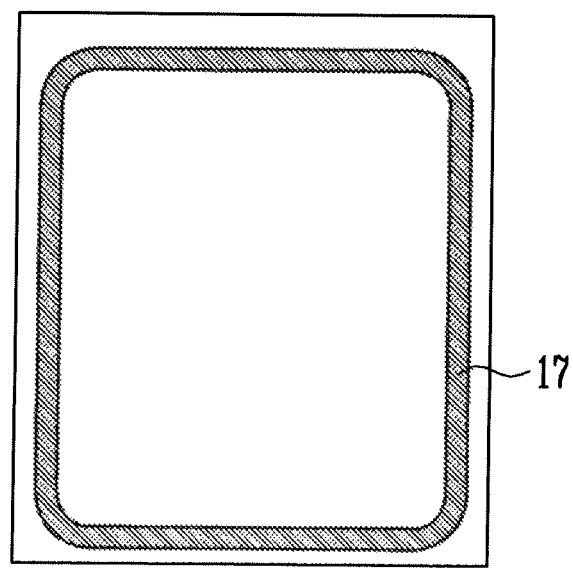
FIG. 7B is a schematic plan view showing the shape of a sealant formed using the dropping technique.

Here, a sealant 17 is formed around the outer perimeter of the first or second substrate 1 or 2 as shown in FIG. 7B. For the convenience of illustration, it will be assumed in the embodiment of FIGS. 6A to 6C that the sealant 17 is formed around an outer perimeter of the second substrate 2. In this case, a filler material 16 is dropped into and used to fill the space surrounded by the sealant 17 on the inner surface of the second substrate 2 using a dropper 40.

Thereafter, as shown in FIG. 6B, the first and second substrates 1 and 2 are aligned together and then assembled while allowing the inner surface of the second substrate 2, filled with the filler material 16, to face the first substrate 1.

Thereafter, as shown in FIG. 6C, the first and second substrates 1 and 2 are joined together by the sealant 17.

However, when the filler material 16 is filled between the first and second substrates 1 and 2 using the dropping technique, the process is performed under vacuum. That is, in the embodiment of FIGS. 6A to 6C, the touch screen panel is fabricated using a vacuum dropping technique.

As described above, the touch screen panel is fabricated using the vacuum dropping technique, thereby minimizing or reducing production of air bubbles and inflow of foreign matters in the process of filling the filler material 16 between the first and second substrates 1 and 2.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel comprising:
    first and second substrates facing each other, the first and second substrates being joined together by a sealant;
    a plurality of first sensing patterns coupled to one another along a first direction on a side of the first substrate facing the second substrate, comprising sensing patterns coupled to one another in rows along the first direction, and pad portions coupled to the rows;
    a plurality of second sensing pattern coupled to one another along a second direction on a side of the second substrate facing the first substrate, comprising sensing patterns coupled to one another in columns along the second direction, and pad portions coupled to the columns;
    a plurality of first dummy patterns directly on the side of the first substrate between the first sensing patterns and corresponding to the second sensing patterns, the first dummy patterns being spaced from each other along the first direction and overlapped with the second sensing patterns that are spaced from each other along the first direction;
    a plurality of second dummy patterns directly on the side of the second substrate between the second sensing patterns and corresponding to the first sensing patterns, the second dummy patterns being spaced from each other along the second direction and overlapped with the first sensing patterns that are spaced from each other along the second direction;
    an insulating layer between the first and second substrates, the insulating layer comprising a filler material and a first insulating layer for directly covering the first sensing patterns and the first dummy patterns, wherein the filler material is disposed directly between the first insulating layer and the plurality of second sensing patterns and the plurality of second dummy patterns; and
    a plurality of metal patterns electrically coupled to pad portions of the plurality of first sensing patterns and the plurality of second sensing patterns, the metal patterns electrically coupling the first sensing patterns and the second sensing patterns to respective position detecting lines,
    wherein the sealant is directly between pad portions of the plurality of second sensing patterns and the plurality of metal patterns electrically coupled to pad portions of the plurality of first sensing patterns, and wherein the sealant comprises a conductive material through which pad portions of the second sensing patterns are electrically coupled to the metal patterns.

2. The touch screen panel of claim 1, wherein the second sensing patterns are alternately arranged with the first sensing patterns so as not to overlap with the first sensing patterns.

3. The touch screen panel of claim 1, wherein the insulating layer comprises the filler material for filling a space between the first substrate having the first sensing patterns and the first dummy patterns formed thereon and the second substrate having the second sensing patterns and the second dummy patterns formed thereon.

4. The touch screen panel of claim 3, wherein the filler material comprises a super view resin (SVR).

5. The touch screen panel of claim 1, wherein the first or second substrate comprises an integrally formed window.

6. The touch screen panel of claim 1, wherein the first and second dummy patterns are formed of same transparent materials as those of the first and second sensing patterns, respectively.

7. The touch screen panel of claim 1, wherein the first and second dummy patterns comprise separated patterns, respectively.

* * * * *